(12) United States Patent
Timmermann et al.

(10) Patent No.: US 9,056,589 B2
(45) Date of Patent: Jun. 16, 2015

(54) REAR WINDSHIELD COMPRISING ELECTRICS PROTECTION BOX

(75) Inventors: Alwin Timmermann, Cologne (DE); Heinz-Erich Dickers, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/116,657

(22) PCT Filed: Apr. 4, 2012

(86) PCT No.: PCT/EP2012/056153
§ 371 (c)(1),
(2), (4) Date: Jan. 6, 2014

(87) PCT Pub. No.: WO2012/159813
PCT Pub. Date: Nov. 29, 2012

(65) Prior Publication Data
US 2014/0210231 A1  Jul. 31, 2014

(30) Foreign Application Priority Data
May 23, 2011  (EP) .................................... 11167015

(51) Int. Cl.
*B60R 11/02* (2006.01)
*B60J 1/18* (2006.01)
*B60R 16/023* (2006.01)

(52) U.S. Cl.
CPC ....... *B60R 16/0239* (2013.01); *Y10T 29/49826* (2013.01); *B60J 1/18* (2013.01)

(58) Field of Classification Search
CPC  B60R 16/0238; B60R 16/0239; B60R 11/02; B60R 11/0264; B60J 1/18; B60J 1/20; B60J 10/00; B60J 10/0057
USPC .................................. 296/146.15, 84.1, 96.11
See application file for complete search history.

(56) References Cited

U.S. PATENT DOCUMENTS

| | | | | |
|---|---|---|---|---|
| 448,141 | A | * | 3/1891 | Northen .......................... 454/289 |
| 4,854,636 | A | * | 8/1989 | Greenhalgh et al. .......... 296/201 |
| 4,993,774 | A | * | 2/1991 | Greenhalgh et al. .......... 296/201 |
| 5,211,466 | A | * | 5/1993 | Jarocki et al. .................. 362/540 |

(Continued)

FOREIGN PATENT DOCUMENTS

| | | |
|---|---|---|
| DE | 42 37 870 | 3/1994 |
| DE | 10 2009 013794 | 11/2009 |

(Continued)

OTHER PUBLICATIONS

PCT International Preliminary Report on Patentability issued on Nov. 26, 2013 for PCT Application PCT/EP2012/056153 filed on Apr. 4, 2012 in the name of Saint-Gobain Glass France (German Original + English Translation).

(Continued)

*Primary Examiner* — Gregory Blankenship
(74) *Attorney, Agent, or Firm* — Steinfl & Bruno LLP (57) ABSTRACT

A rear windshield with protection box for electronic components is described. The rear windshield has a car body connection fastened to a windshield, a protection box fastened on the car body connection, a protection box base body, a protection box cover, and a foam encapsulation of the car body connection. The foam encapsulation seals off and fixes the protection box base body at the car body connection.

27 Claims, 6 Drawing Sheets

(56) References Cited

U.S. PATENT DOCUMENTS

| | | | |
|---|---|---|---|
| 6,118,410 A * | 9/2000 | Nagy | 343/713 |
| 6,231,111 B1 * | 5/2001 | Carter et al. | 296/146.15 |
| 6,994,395 B2 * | 2/2006 | Cathala | 296/193.04 |
| 7,172,322 B2 * | 2/2007 | Pommeret et al. | 362/503 |
| 7,642,908 B2 * | 1/2010 | Mertens | 340/463 |
| 7,954,808 B2 * | 6/2011 | Tomida | 271/207 |
| 7,963,590 B2 * | 6/2011 | Hart et al. | 296/193.09 |
| 8,235,460 B2 * | 8/2012 | Plavetich et al. | 296/215 |
| 2006/0109178 A1 * | 5/2006 | Takeuchi et al. | 343/700 MS |
| 2008/0129619 A1 * | 6/2008 | Lee et al. | 343/713 |
| 2011/0032164 A1 * | 2/2011 | Villarroel et al. | 343/713 |
| 2014/0210231 A1 * | 7/2014 | Timmermann et al. | 296/146.15 |

FOREIGN PATENT DOCUMENTS

| | | | |
|---|---|---|---|
| DE | 10 2009 043100 | 3/2011 | |
| EP | 0652142 | 5/1995 | |
| GB | 2 167 120 | 5/1986 | |
| JP | 2012-151691 | * 8/2012 | B60R 11/02 |

OTHER PUBLICATIONS

PCT International Search Report mailed on Jul. 11, 2012 for PCT Application PCT/EP2012/056153 filed on Apr. 4, 2012 in the name of Saint-Gobain Glass France.

* cited by examiner

| A protection box basic element (4a) is fastened with a flange (4c) on a vehicle body connection (1). |
|---|

| A rear windshield (2) is fastened on the vehicle body connection (1). |
|---|

| A contact surface (5) of the rear windshield (2) with the vehicle body connection (1) as well as the vehicle body connection (1) are provided with a foam encapsulation, with the foam encapsulation sealing and affixing the protection box basic element (4a) on the vehicle body connection (1) via the flange (4c). |
|---|

FIG. 6

REAR WINDSHIELD COMPRISING ELECTRICS PROTECTION BOX

CROSS REFERENCE TO RELATED APPLICATIONS

The present application is the US national stage of International Patent Application PCT/EP2012/056153 filed on Apr. 4, 2012 which, in turn, claims priority to European Patent Application EP 11167015.4 filed on May 23, 2011.

The invention relates to a rear windshield with protection box, a method for its production, and use thereof.

In modern motor vehicles, rear windshields are outfitted with a large number of technical functions. Examples of this include rear window heating, integrated antennas, or wiper devices. In addition to the conventional heating resistors, there are thus also increasingly antenna and control electrical systems. With all application capabilities, in addition to the switching and control processors, the actual wiring assumes an increasingly important role. This wiring requires a large number of plug connections or electronic components such as antenna amplifiers which must be installed moisture proof and stable with minimum space requirements.

Due to the increasingly complex interconnectedness of the electrical components, the susceptibility to interference also increases at the same time in many cases. Whereas the actual cables can be relatively simply shielded against environmental effects, this is much more difficult in the area of plug connections. In addition, in many motor vehicles the actual control electronics are placed in the so-called wet space of the car body. Especially in the transition from the dry interior area (dry space) of the vehicle into the wet space, the electrical systems must be designed moisture proof. In the region of cable connections, moisture can readily result in disruptions such as short circuits or even complete system failure. To prevent this, cable connections are frequently provided with foam encapsulations, for example, polyurethane. In the case of window panes encased in foam, is possible to embed the components to be protected either directly in the foam material or, without any additional process step, to produce the walls of a protective housing in the foaming process. The protective housing is, in this case, completed by a cover and thus makes possible a sealed space accessible for the subsequent installation of electronic components or for maintenance purposes.

The disadvantage of producing a protective housing made of foam material is that due to the requirements of the window pane foam encapsulation, the material used must be relatively soft and thus large wall thicknesses of the structures of the protective housing produced in the same process as the foam encapsulation become necessary. However, a large wall thickness means that the sealing surface is wide by way of comparison with the cover. Since the forces on the cover must not be arbitrarily high, there is, as a result, a low surface pressure between the wall and the cover of the protective housing. Thus, reliable sealing becomes more difficult.

Another group of problems results from the formation of bubbles in the material of the foam encapsulation. From the process standpoint, it is not possible to prevent bubbles from forming on the sealing surfaces in the area near the surface. These bubbles must be opened in costly reworking and filled with new foam encapsulation material. Bubble formation is particularly problematic in the region of the cable bushings through the thick-walled sides of the protective housing. The complex sealing surfaces of the cable bushings are not readily accessible for reworking.

The foam encapsulation material also does not permit forming stable retainers for the electronic components inside the protective housing. Defined fixing of the components inside the protective housing is possible only with the assistance of additional fastening components. These must be installed in separate, additional process steps in the region of the protective housing.

DE 10 2009 013 794 A1 discloses an electric junction box in a motor vehicle. The junction box is capable even in the event of a traffic accident of maintaining the power supply of the individual loads in the vehicle.

GB 2,167,120 A discloses a remote control device for opening and closing a rear windshield in a vehicle.

The object of the invention is to provide a device which seals control electronics or cable plug connections in the region of a vehicle rear windshield in a stable and watertight manner.

The object of the present invention is accomplished according to the invention by a rear windshield with a protection box in accordance with independent claim 1. Preferred embodiments emerge from the subclaims.

A method according to the invention for producing a rear windshield with a protection box and its use emerge from other independent claims.

The rear windshield with a protection box for electronic components according to the invention comprises a vehicle body connection fastened on a window pane. The vehicle body connection functions as a connection or connection part between the rear windshield and the vehicle body. The vehicle body connection preferably includes metals and/or polymers, particularly preferably aluminum, iron, titanium, chromium, vanadium, tungsten, nickel, or polyethylene, polypropylene, polystyrene, polyurethanes, polymethyl methacrylates, polyacrylate, polyester, polyamide, polyethylene terephthalate, and/or mixtures or copolymers thereof. A protection box is fastened on the vehicle body connection. The protection box comprises a protection box basic element and a protection box cover. The protection box includes preferably plastics, preferably polymers, particularly preferably polyethylene, polycarbonates, polypropylene, polystyrene, polyurethanes, polymethyl methacrylates, polyacrylates, polyesters, polyamides, polyethylene terephthalate. A foam encapsulation encases the connection plate or vehicle body connection as well as, preferably, the contact surface of the window pane with the vehicle body connection. The foam encapsulation seals the edge of the protection box basic element on the vehicle body connection and affixes the protection box basic element on the vehicle body connection.

The foam encapsulation preferably seals the protection box basic element on the vehicle body connection via a flange and thus affixes the protection box basic element on the vehicle body connection. The flange is part of the protection box basic element and preferably protrudes at least 3 mm laterally from the protection box basic element and/or at least 1 mm vertically from the vehicle body connection. The flange is situated on the side of the protection box basic element facing the vehicle body connection.

The protection box basic element and/or flange is preferably sealingly fastened or pre-affixed via a double-sided adhesive tape or a foam tape on the vehicle body connection.

The protection box preferably contains an electronics module. The electronics module particularly preferably includes an antenna control, heating control, closing control, and/or wiper control.

The protection box preferably includes at least one socket for one or a plurality of plugs or connection plugs and couplers.

The protection box preferably includes retainers as well as alignment means for the electronics module. The retainers preferably comprise latches, threaded caps, or clips; the alignment means preferably comprise reinforcement ribs for reproducible positioning of the protection box.

The protection box preferably has a cable pass-through, particularly preferably a watertight cable pass-through.

The protection box preferably includes a desiccant, particularly preferably silica gel, $CaCl_2$, $Na_2SO_4$, activated carbon, silicates, bentonites, zeolites, and/or mixtures thereof. The desiccants can be incorporated into the surface of the protection box and/or arranged in open containers in the protection box. The desiccants are preferably arranged such that an air and moisture exchange with the air in the interior of the protection box is possible but the materials cannot fly about and are fixed. This can preferably be accomplished by enclosing the desiccant in an air- and moisture-permeable polymer film or in a fine-meshed net.

The protection box basic element and/or the protection box cover preferably has clips or threaded caps.

The foam encapsulation preferably contains polyurethane, isocyanates, polyalcohols, polystyrene, polypropylene, polyethylene, polyethylene terephthalate, and/or mixtures or copolymers thereof.

A damping element, particularly preferably a foam, woven fabric, or nonwoven fabric, are arranged between the protection box basic element and the vehicle body connection. The damping reduces the vibrations, noises, and impacts acting on the protection box when the vehicle is driven.

The flange on the protection box basic element preferably has positioning aids, particularly preferably holes, slots, or lugs.

The invention further includes a method for producing a rear windshield. In a first step, a protection box basic element is fastened with a flange on a vehicle body connection. The fastening can be accomplished, for example, using adhesive bonding and/or a screw connection. Then, a window pane, preferably a rear windshield, is fastened on the vehicle body connection. One contact surface of the window pane with the vehicle body connection as well as the vehicle body connection itself are provided with a foam encapsulation. The encapsulation in foam is accomplished preferably in the manner familiar to the person skilled in the art in a suitable casting mold. The foam encapsulation is flat such that the foam encapsulation seals and affixes the protection box basic element to the vehicle body connection via the flange.

The protection box basic element is preferably provided in a final step with a protection box cover and closed. The closure can be reversible or irreversible.

The invention further includes the use of the rear windshield in automobiles, buses, and/or trucks.

In the following, the invention is explained in detail with reference to drawings. The drawings are a purely schematic representation and not true to scale. They in no way restrict the invention.

They depict.

Figure 1:
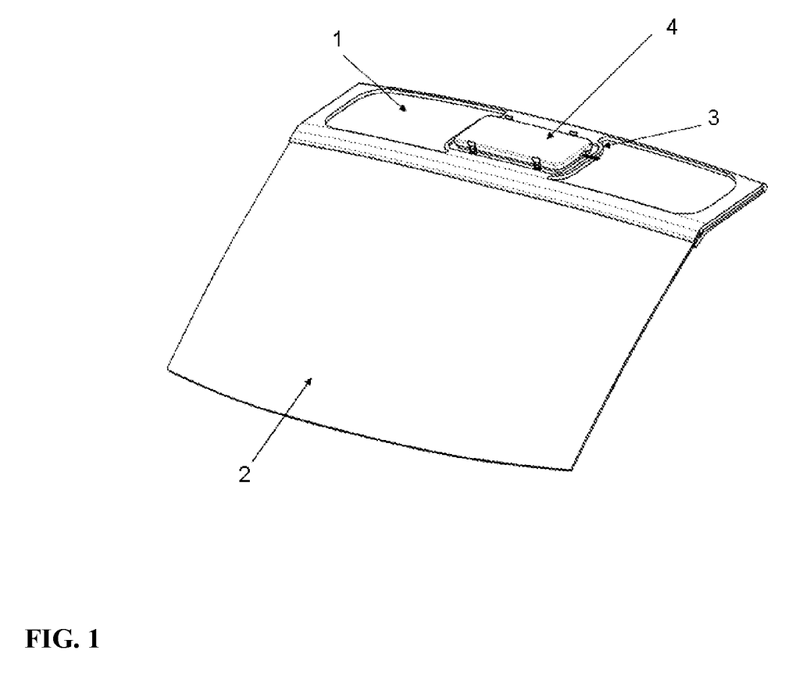
FIG. 1 a schematic view of the rear windshield according to the invention.

FIG. 1 depicts a schematic view of the rear windshield according to the invention. A window pane (2) is connected to a vehicle body connection (1). A protection box (4) is fastened on the vehicle body connection (1). The protection box (4) comprises (not shown) a protection box basic element (4a) and a protection box cover (4b). A foam encapsulation (3) surrounds the vehicle body connection (1) and the contact surface (5) between the window pane (2) and the vehicle body connection (1). The foam encapsulation (3) affixes the protection (4) on the vehicle body connection (1) and, at the same time, seals the protection box (4).

Figure 2:
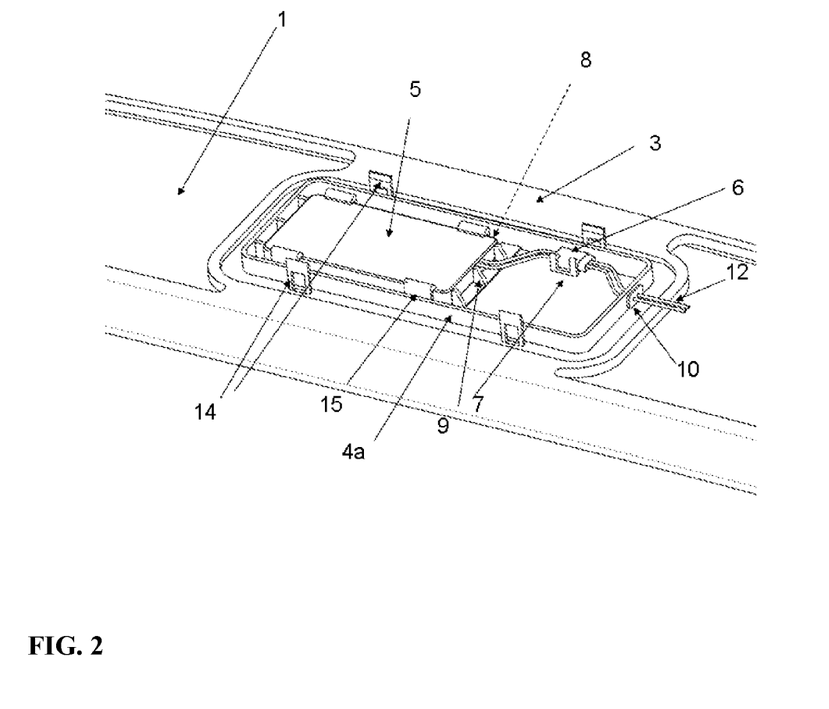
FIG. 2 a schematic view of the protection box basic element fastened on the vehicle body connection, FIG. 3 a cross-section of the rear windshield according to the invention, FIG. 4 a schematic view of the protection box fastened on the vehicle body connection, FIG. 5 a schematic plan view of a preferred embodiment of the protection box basic element fastened on the vehicle body connection, and FIG. 6 a flowchart of the method according to the invention.

FIG. 2 depicts a schematic view of the protection box basic element (4a) fastened on the vehicle body connection (1). The foam encapsulation (3) affixes the protection box basic element (4a) on the vehicle body connection (1). Alignment means/reinforcement ribs (9) stabilize and align the protection box basic element (4a). The protection box basic element (4a) includes an electronics module (5), for example, an antenna control. The electronics module (5) is connected to an outward leading cable (12) via a plug (6), which is affixed via a socket (7). A sealed cable bushing (10) prevents the penetration of moisture into the protection box basic element (4a). The protection box basic element (4a) is sealed by clips (14) with the (not shown) protection box cover (4b) and forms the actual protection box (4). Damping elements (8), which reduce the vibrations transferred to the protection box (4), are preferably situated under the protection box basic element (4a).

Figure 3:
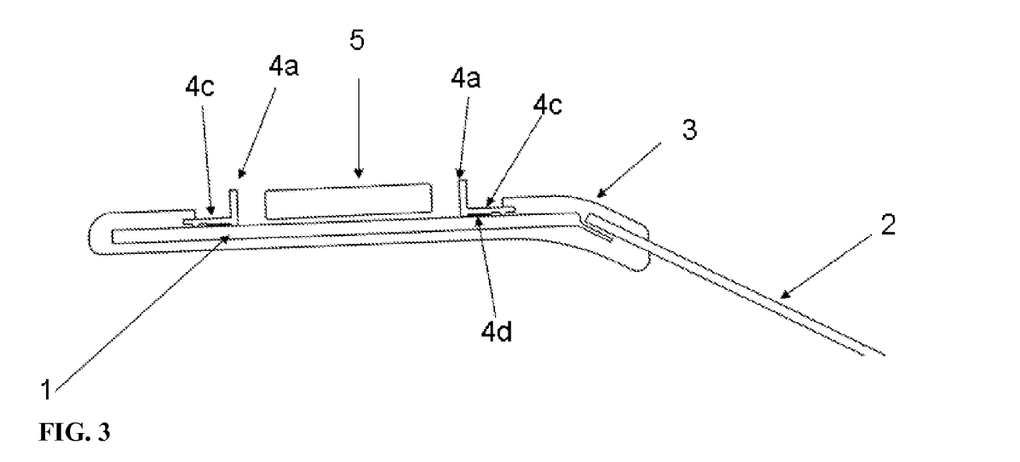

FIG. 3 depicts a cross-section of the rear windshield according to the invention. The vehicle body connection (1) is connected to a window pane (2). A foam encapsulation (3) encloses the vehicle body connection (1), a protection box basic element (4a), and a contact surface (5) of the window pane (2) with the vehicle body connection (1). The foam encapsulation (3) seals the protection box basic element (4a) via a flange (4c) on the vehicle body connection (1). The protection box basic element (4a) is fastened on the vehicle body connection (1) via a double-sided adhesive tape (4d). An electronics module (5) is arranged inside the protection box basic element (4a).

Figure 4:
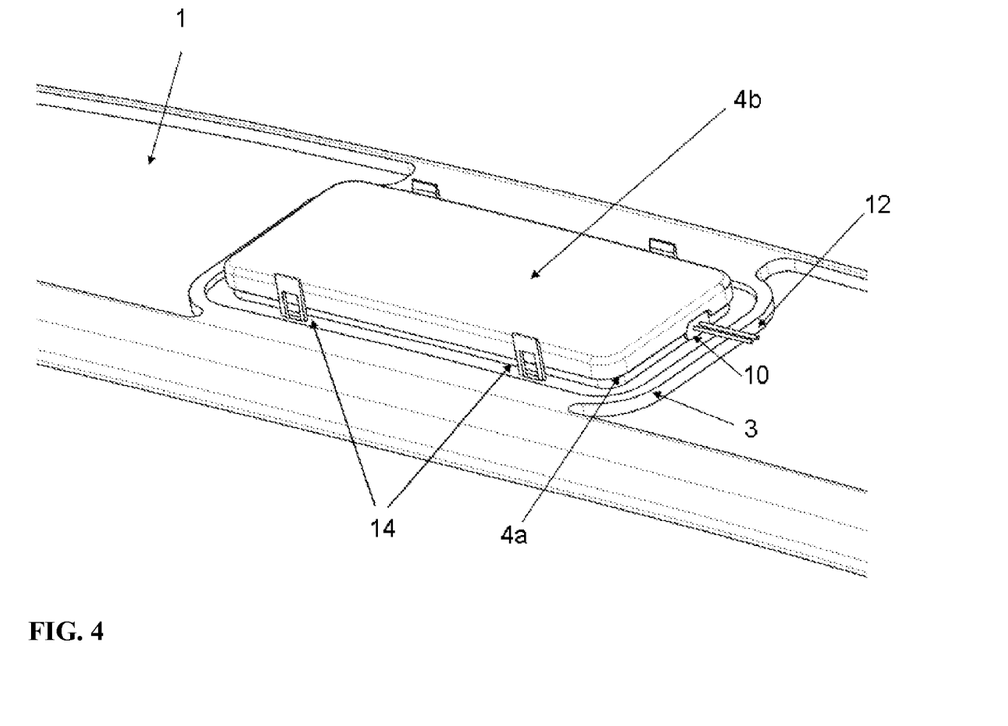

FIG. 4 depicts a schematic view of the protection box (4) made up of the protection box basic element (4a) and the protection box cover (4b) fastened on the vehicle body connection (1). Clips (14) enable a reclosable closure of the protection box (4). The electrical contacting is accomplished via a cable (12) through a watertight cable pass-through (10). A foam encapsulation (3) surrounds the protection box (4) on the vehicle body connection (1).

Figure 5:
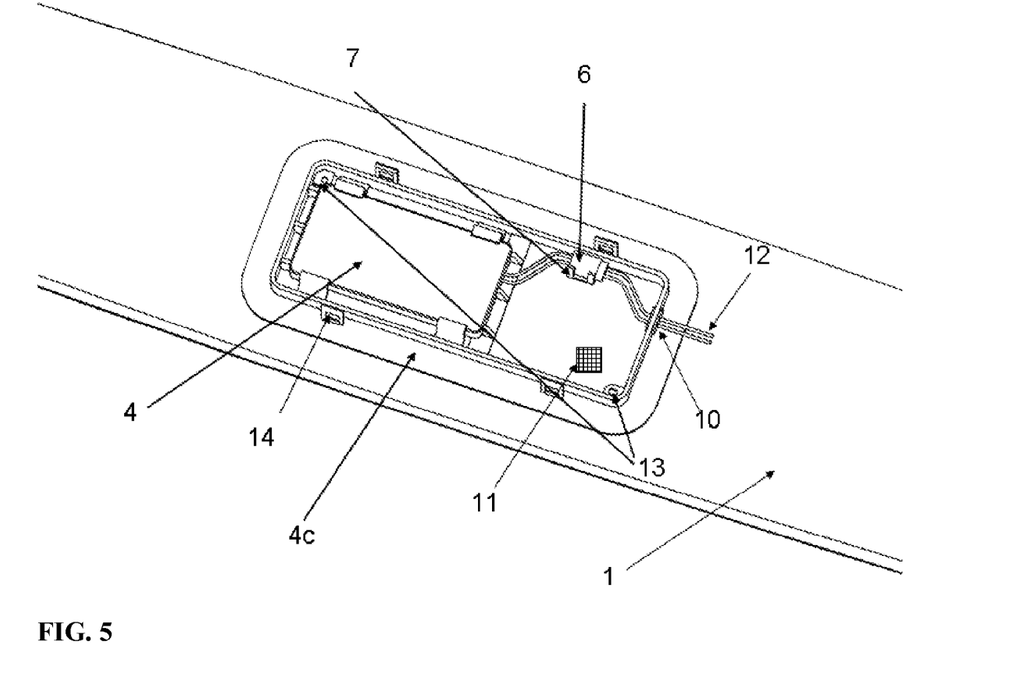

FIG. 5 depicts a plan view of a preferred embodiment of the protection box basic element (4a) fastened on the vehicle body connection (1) and a flange (4c). The structure made up of electronics module (5), plug (6), socket (7), outward leading cable (12), and cable bushing (10) corresponds to that depicted in FIG. 2. Positioning aids (13) enable the affixing and positioning of the protection box basic element before the actual fastening or adhesive bonding. A desiccant (11) traps any residual moisture.

Figure 6:
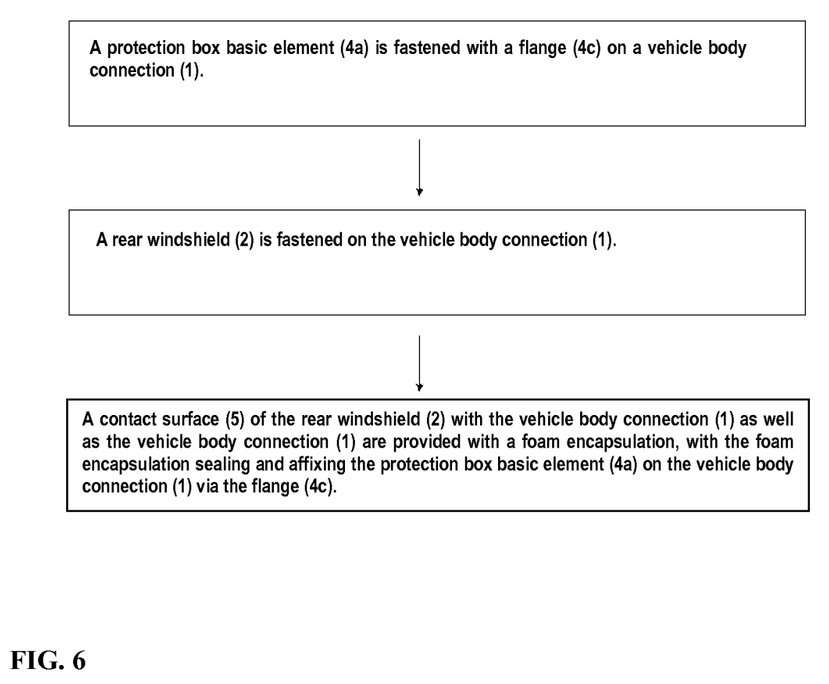

FIG. 6 depicts a flowchart of the method according to the invention. In a first step, a protection box basic element (4a) with a flange (4c) is fastened on a vehicle body connection (1) using adhesive bonding and/or a screw connection (13). Then, a window pane (2), preferably a rear windshield, is fastened on the vehicle body connection (1). Alternatively, the fastening of the window pane can also take place at the beginning of the method directly on the vehicle body connection (1). A contact surface (5) of the window pane (2) with the vehicle body connection (1) as well as the vehicle body connection (1) itself are provided with a foam encapsulation (3). The foam encapsulation occurs preferably in the manner familiar to the person skilled in the art by injection molding in a suitable casting mold. The foam encapsulation is also flat such that the foam encapsulation (3) seals and affixes the protection box basic element (4) on the vehicle body connection (1) via the flange (4c).

LIST OF REFERENCE CHARACTERS (1) vehicle body connection
(2) window pane
(3) foam encapsulation
(4) protection box
(4a) protection box basic element
(4b) protection box cover
(4c) flange
(4d) double-sided adhesive tape/sealing foam tape
(5) electronics module
(6) plug
(7) socket
(8) damping element
(9) alignment means/reinforcement ribs
(10) cable pass-through
(11) desiccant
(12) cable
(13) positioning aids
(14) clips/threaded cap
(15) retainer/latch

The invention claimed is:

1. A rear windshield with protection box for electronic components, comprising:
   a vehicle body connection fastened on a window pane,
   the protection box fastened on the vehicle body connection comprising a protection box basic element and a protection box cover, and
   a foam encapsulation of the vehicle body connection, wherein the foam encapsulation seals and affixes the protection box basic element on the vehicle body connection.

2. The rear windshield according to claim 1, wherein the foam encapsulation seals and affixes the protection box basic element on the vehicle body connection via a flange.

3. The rear windshield according to claim 1, wherein the protection box basic element is fastened on the vehicle body connection via an adhesive or double-sided adhesive tape.

4. The rear windshield according to claim 1, wherein the protection box contains an electronics module.

5. The rear windshield according to claim 1, wherein the protection box includes a socket for a plug.

6. The rear windshield according to claim 1, wherein the protection box includes retainers and/or alignment means for an electronics module.

7. The rear windshield according to claim 1, wherein the protection box has a cable pass-through.

8. The rear windshield according to claim 1, wherein the protection box contains a desiccant.

9. The rear windshield according to claim 1, wherein the protection box basic element and/or the protection box cover has clips or threaded caps.

10. The rear windshield according to claim 1, wherein the foam encapsulation contains i) polyurethane, ii) isocyanates, iii) polyalcohols, iv) polystyrene, v) polypropylene, vi) polyethylene, vii) polyethylene terephthalate, mixtures of i)-vii) or copolymers of i)-vii).

11. The rear windshield according to claim 1, wherein a damping element is arranged between the protection box basic element and the vehicle body connection.

12. The rear windshield according to claim 2, wherein the flange has positioning aids.

13. The rear windshield according to claim 2, wherein the flange is fastened on the vehicle body connection via an adhesive or double-sided adhesive tape.

14. The rear windshield according to claim 1, wherein the protection box contains an antenna control.

15. The rear windshield according to claim 1, wherein the protection box contains a heating control.

16. The rear windshield according to claim 1, wherein the protection box contains a closing control.

17. The rear windshield according to claim 1, wherein the protection box contains a wiper control.

18. The rear windshield according to claim 1, wherein the protection box has a watertight cable bushing.

19. The rear windshield according to claim 1, wherein a foam is arranged between the protection box basic element and the vehicle body connection.

20. The rear windshield according to claim 1, wherein a woven fabric is arranged between the protection box basic element and the vehicle body connection.

21. The rear windshield according to claim 1, wherein a nonwoven fabric is arranged between the protection box basic element and the vehicle body connection.

22. The rear windshield according to claim 2, wherein the flange has holes.

23. The rear windshield according to claim 2, wherein the flange has slots.

24. The rear windshield according to claim 2, wherein the flange has cams.

25. A method comprising:
   using the rear windshield according to claim 1 in automobiles, buses, and/or trucks.

26. A method for producing a rear windshield, comprising:
   fastening a protection box basic element with a flange on a vehicle body connection,
   fastening a window pane on the vehicle body connection, and
   providing a contact surface of the window pane with the vehicle body connection as well as the vehicle body connection with a foam encapsulation, wherein the foam encapsulation seals and affixes the protection box basic element via the flange on the vehicle body connection.

27. The method according to claim 26, further comprising providing the protection box basic element with a protection box cover.

* * * * *